(No Model.)   2 Sheets—Sheet 1.

H. S. SHIELDS.
HAY RAKE.

No. 260,056. Patented June 27, 1882.

Attest:
F. H. Schott.
W. H. Brereton

Inventor:
Hamilton Leroy Shields
Per Wm. H. Brereton,
Atty.

(No Model.) 2 Sheets—Sheet 2.
H. S. SHIELDS.
HAY RAKE.
No. 260,056. Patented June 27, 1882.
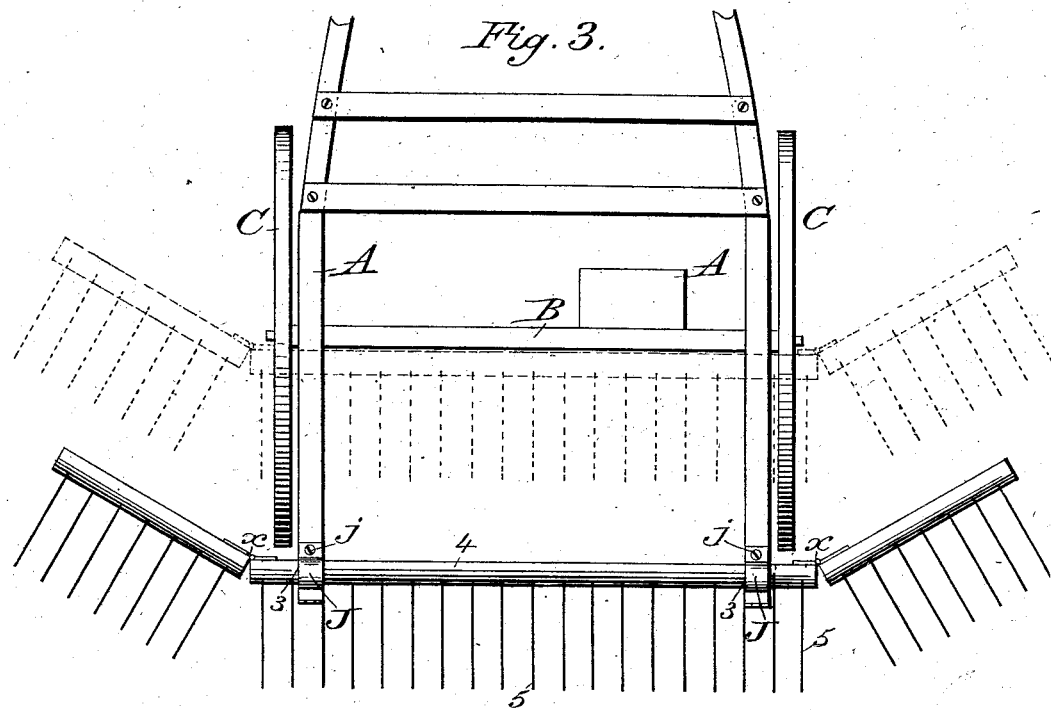
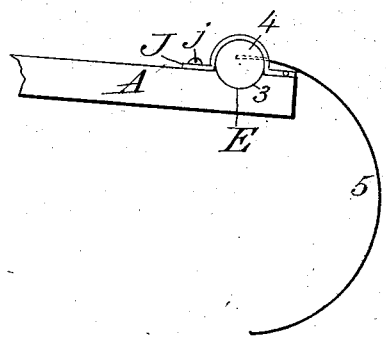
Attest:
H. H. Schott.
Wm H Brereton Sr
Inventor.
Hamilton Leroy Shields
Per Wm H Brereton,
atty.

UNITED STATES PATENT OFFICE.

HAMILTON L. SHIELDS, OF TROY, NEW YORK.

HAY-RAKE.

SPECIFICATION forming part of Letters Patent No. 260,056, dated June 27, 1882.

Application filed January 6, 1882. (No model.)

*To all whom it may concern:*

Be it known that I, HAMILTON LEROY SHIELDS, a citizen of the United States, residing at Troy, in the county of Rensselaer and State of New York, have invented certain new and useful Improvements in Hay-Rakes; and I do hereby declare the following to be a full, clear, and exact description of the invention, such as will enable others skilled in the art to which it appertains to make and use the same.

My invention has relation to hay-rakes; and my said invention consists in a novel construction and arrangement of the parts composing the same, as and for the purposes hereinafter more fully described, and forming the subject-matter of the claims.

My invention may be briefly described as being composed or consisting, first, in the combination, with the bars which form the thills for the team, of a rake made to extend laterally beyond the ground-wheels of the machine and removably secured to the thills, a bar extending parallel with the rake-head through which the teeth pass, bars at each end of the rake-head to connect the rake-head and parallel-placed bar, and two diagonal rods by which the teeth through said parallel-placed bar are lifted; and, second, in the combination, with the rake-head and parallel-placed bar, of short lever-arm attached to the rake-head, two diagonal rods connecting the parallel-placed bar with the short lever-arm, a pivoted hand-lever, and connecting-bar by which the raising of the rake is effected.

Figure 2:
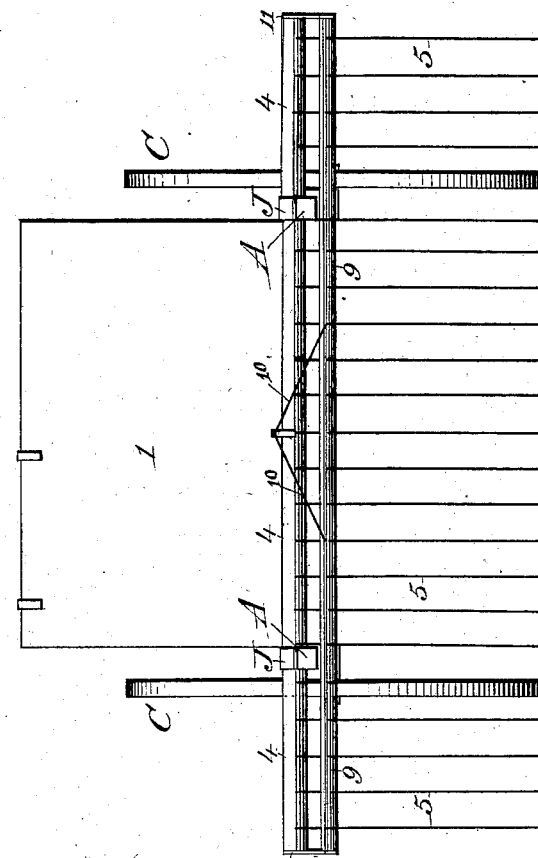
Figure 1:
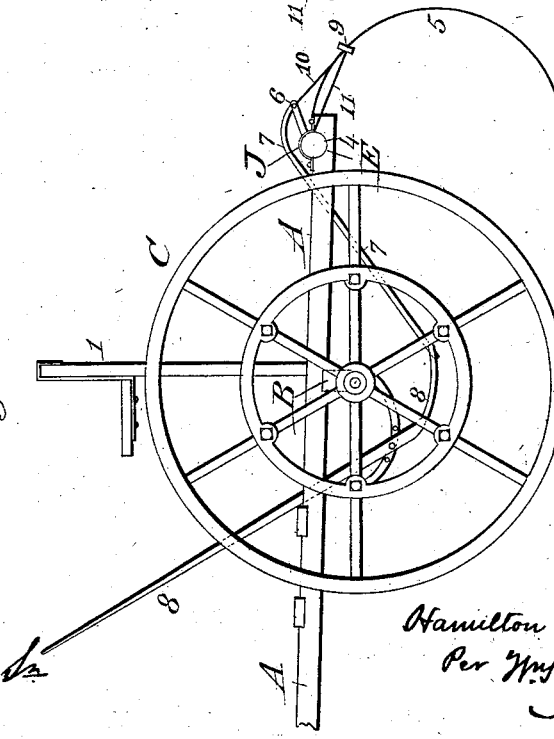

Referring to the drawings forming part of this specification, Figure 1 will be found to represent a side, and Fig. 2 an end, elevation of a rake constructed in accordance with my invention; Fig. 3, a plan view of the same; and Fig. 4, a detailed view of one of the rake-teeth, showing its mode of attachment to the head and the head to the thills.

To construct a rake in accordance with my invention I proceed about as follows: To a head, 4, made of any length desired, about twelve feet long being preferred, is attached a number of spring curved teeth, 5. Cut in this rake-head are grooves 3, corresponding in position to the recess E in the ends of the thills A, by which means the rake is fastened upon the thills, the hinged strap and pin J j securing it in place. The rake is made of such length as when in position to extend some distance beyond the outer sides of the wheels C, the extent of this projection beyond the wheels being governed by the amount of power employed, whether one or two horses.

At the center of the rake-head is a short bar, 6, pivoted to a curved rod, 7, which in turn is pivoted to the lower end of the hand-lever 8. Situated some little distance from the rake-head is a parallel-placed small bar, 9, connected or attached to the rake-head, through which the rake-teeth pass, and by which they are held in proper positions. Extending from this bar 9 to the short bar 6 on the rake-head are diagonal rods 10, and at each end are bars 11, which unite the bar 9 to the rake-head.

The object of the parallel-placed bar 9 is, in addition to that of holding the teeth in place, to form a means whereby the rake-teeth may be lifted as the rake-head revolves in its bearings. Thus the strain on the teeth is removed from the usual place—where attached to the rake-head—to some distance below their attaching ends. The lifting of the parallel bar is effected through the medium of the diagonal bars 10, secured to said bar about its middle portion and to the short lever-arm 6 on the rake-head, at the same time that the revolution of the rake-head is effected through the curved bar 7 and hand-lever 8. By this arrangement of levers and manner of attaching rake-head on the thills the rake is, when desired to be dumped, caused to revolve, and is not lifted bodily up, as is usual. Therefore the power required to operate the rake is comparatively slight.

By extending the rake-head behind and beyond the ground-wheels C, as herein shown and described, a much greater width of ground can be operated upon, and by reason of the lateral extensions of the rake beyond the wheels the machine works steadier and without the usual oscillating jerks and jars. In going through gates the rake may be quickly removed from the frame by simply withdrawing the bolts j and throwing back the hinged straps J. It is proposed when using such wide rakes to make them in three sections, the two sections or portions projecting beyond the wheels being united to the central part by a hingejoint back of the wheels, as shown at x, Fig. 3. By this provision in passing the gates all that would be necessary would be to fold the sections toward the machine, which could be done by rods or bars provided for this purpose.

The seat for the driver is provided by suspending a seat upon a vertically-arranged board, 1, secured between the thills A and to the axle B. These parts—thill A, dividing-board 1, and seat—are the same as those employed by me and shown and described in my application filed November 25, 1881, for combined hay tedder and loader.

Having thus described my invention, what I claim is—

1. The combination, in a hay-rake, with the bars A, which form the thills for the team, of the rake 4 5, extending laterally beyond the ground-wheels and removably secured to the thills, bar 9, extending parallel with the rake-head and through which the teeth pass, bars 11, connecting the ends of the rake-head and bar 9, and diagonal rods 10, by which the teeth through said bar 9 are lifted, as hereinbefore described, for the purposes specified.

2. The combination, in a hay-rake, with the rake-head 4 and parallel-placed bar 9, of short lever-arm 6, attached to the rake-head, diagonal rods 10, connecting the bar 9 with the arm 6, and by which the raising of the rake-teeth is effected, pivoted hand-lever 8, and connecting-bar 7, as hereinbefore described, for the purposes specified.

HAMILTON LEROY SHIELDS.

In presence of—
GEO. F. GREENE,
JOHN C. COLE.